(12) United States Patent
Nakamura et al.

(10) Patent No.: US 8,992,194 B2
(45) Date of Patent: Mar. 31, 2015

(54) ROTATION DEVICE INCLUDING SEAL STRUCTURE

(75) Inventors: Yuki Nakamura, Kariya (JP); Tomoaki Kawabata, Takahama (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 0 days.

(21) Appl. No.: 13/698,950

(22) PCT Filed: May 20, 2011

(86) PCT No.: PCT/JP2011/061624
§ 371 (c)(1),
(2), (4) Date: Nov. 19, 2012

(87) PCT Pub. No.: WO2011/145717
PCT Pub. Date: Nov. 24, 2011

(65) Prior Publication Data
US 2013/0064704 A1    Mar. 14, 2013

(30) Foreign Application Priority Data
May 20, 2010    (JP) .................................. 2010-116757

(51) Int. Cl.
*F04C 15/00* (2006.01)
*F04C 2/10* (2006.01)
(Continued)

(52) U.S. Cl.
CPC .............. *F04C 15/00* (2013.01); *B60T 8/4031* (2013.01); *F04C 2/102* (2013.01); *F16J 15/3236* (2013.01); *F04C 15/0038* (2013.01)
USPC ........... 418/104; 418/128; 418/129; 277/563; 277/573; 303/116.4

(58) Field of Classification Search
USPC .............. 418/104, 128, 129, 160, 171, 206.6; 277/176
See application file for complete search history.

(56) References Cited

U.S. PATENT DOCUMENTS 3,885,801 A * 5/1975 Scannell ........................ 277/556
4,174,846 A * 11/1979 Scott ............................ 277/556
(Continued)

FOREIGN PATENT DOCUMENTS

EP    0 490 204 A1    6/1992
FR    1.231.867    10/1960
(Continued)

OTHER PUBLICATIONS

International Search Report (PCT/ISA/210) issued on Aug. 23, 2011, by the Japanese Patent Office as the International Searching Authority for International Application No. PCT/JP2011/061624.
(Continued)

*Primary Examiner* — Mary A Davis
*Assistant Examiner* — Paul Thiede
(74) *Attorney, Agent, or Firm* — Buchanan Ingersoll & Rooney PC (57) ABSTRACT

A seal member is configured so that an annular rubber member is disposed in an annular storage chamber of a resin annular member. Thus, the rubber annular member is not directly in contact with a drive shaft, and the rubber annular member can be prevented from wearing or peeling without requiring a rotation stopping structure for the seal member. Furthermore, the seal member is provided with first and second communication mouths, so that a brake fluid pressure is applied to compartments obtained by dividing the annular storage chamber using the rubber annular member. Thus, the rubber annular member is pressed, and then is elastically deformed, and accordingly, the resin annular member is expanded by the elastic force. Thus, a self-sealing operation can be performed on the basis of a high pressing force.

6 Claims, 6 Drawing Sheets

(51) Int. Cl.
*B60T 8/40* (2006.01)
*F16J 15/32* (2006.01)

(56) References Cited

U.S. PATENT DOCUMENTS

| | | | | |
|---|---|---|---|---|
| 4,703,937 | A * | 11/1987 | Chrzanowski | 277/584 |
| 4,900,042 | A * | 2/1990 | Genda | 277/584 |
| 5,265,890 | A | 11/1993 | Balsells | |
| 6,150,747 | A * | 11/2000 | Smith et al. | 310/216.137 |
| 6,273,527 | B1 | 8/2001 | Yamaguchi et al. | |
| 6,663,110 | B2 * | 12/2003 | Platner | 277/563 |
| 7,530,647 | B2 | 5/2009 | Yamaguchi et al. | |
| 2008/0014076 | A1 * | 1/2008 | Roddis et al. | 415/174.2 |

FOREIGN PATENT DOCUMENTS

| | | |
|---|---|---|
| JP | 45-000417 Y1 | 1/1970 |
| JP | 62-179466 U | 11/1987 |
| JP | 11-280912 A | 10/1999 |
| JP | 2007-278084 A | 10/2007 |

OTHER PUBLICATIONS

Office Action issued Sep. 17, 2013, in the German Patent Office in corresponding German Patent Application No. 11 2011 101 718.9, and an English Translation of the Office Action. (13 pages).

* cited by examiner

PRIOR ART

ROTATION DEVICE INCLUDING SEAL STRUCTURE

TECHNICAL FIELD

The present invention relates to a rotation device including a seal structure which can be favorably applied to a rotary pump device including a seal structure which is provided between a drive shaft of a rotary pump in a brake device and a casing for housing the rotary pump and is for preventing brake fluid from leaking from between the drive shaft and the casing.

BACKGROUND ART

Figure 6:
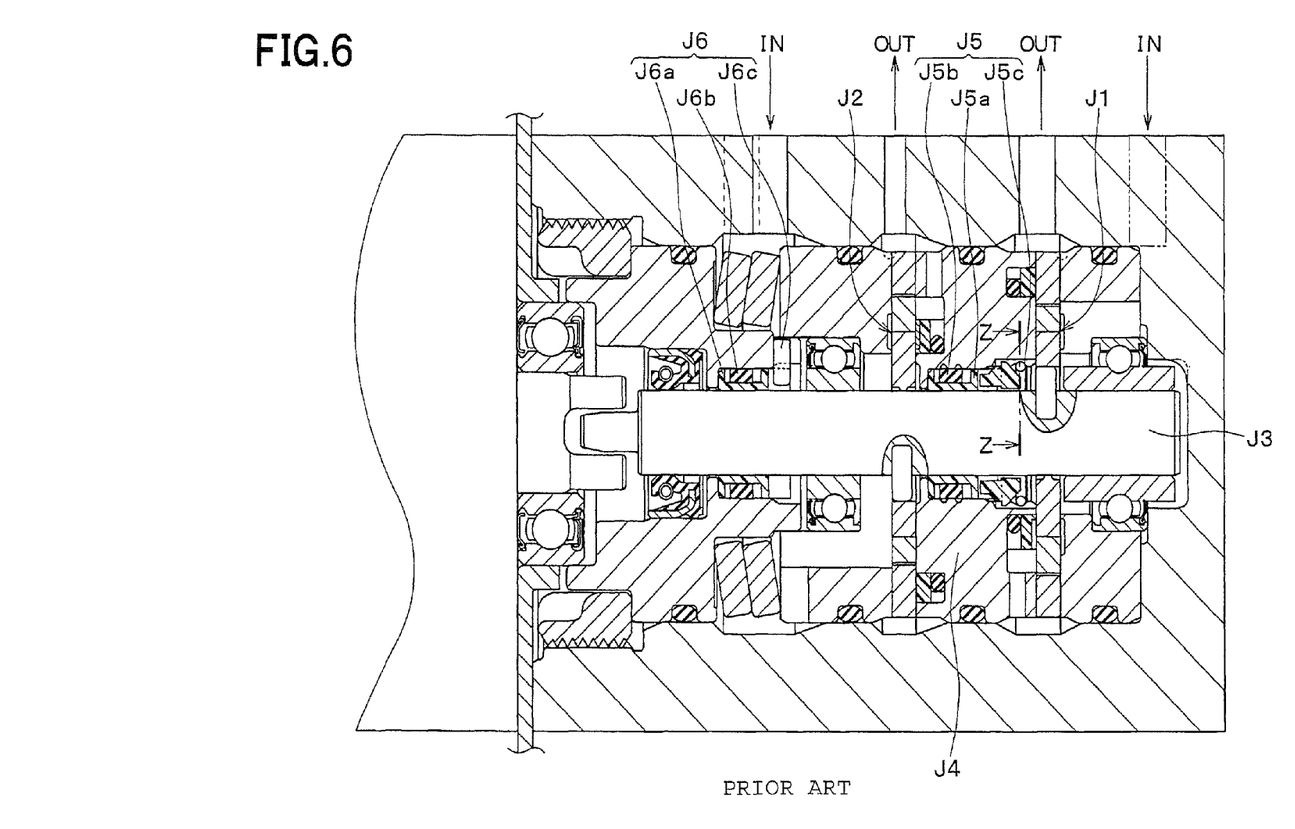
FIG. 6 is a cross sectional view showing a pump body including rotary pump installed to a conventional brake device.

Conventionally, PTL 1 discloses a brake device including a rotary pump. FIG. 6 is a cross sectional view of a pump body including the rotary pump installed to this conventional brake device. As is shown in this drawing, disposed are seal structures J5, J6 having resin annular members J5a, J6a and rubber annular members J5b, J6b between a drive shaft J3 for driving rotary pumps J1, J2 and a casing J4 for housing the rotary pumps J1, J2. These seal structures J5, J6 prevents brake fluid from leaking between the drive shaft J3 and the casing J4.

More specifically, the seal structure J5, J6 are disposed so that the resin annular members J5a, J6a are in contact with the drive shaft J3, and that the rubber annular members J5b, J6b are in contact with the casing J4. Friction between the rubber annular members J5b, J6b and the casing J4 would cause wearing or peeling of the rubber annular members J5b, J6b if the resin annular members J5a, J6a and the rubber annular members J5b, J6b rotated together with the drive shaft J3. Therefore, the seal structures J5, J6 are structured so that the resin annular members J5a, J6a and the rubber annular members J5b, J6b do not rotate relative to the casing J4.

Figure 7:
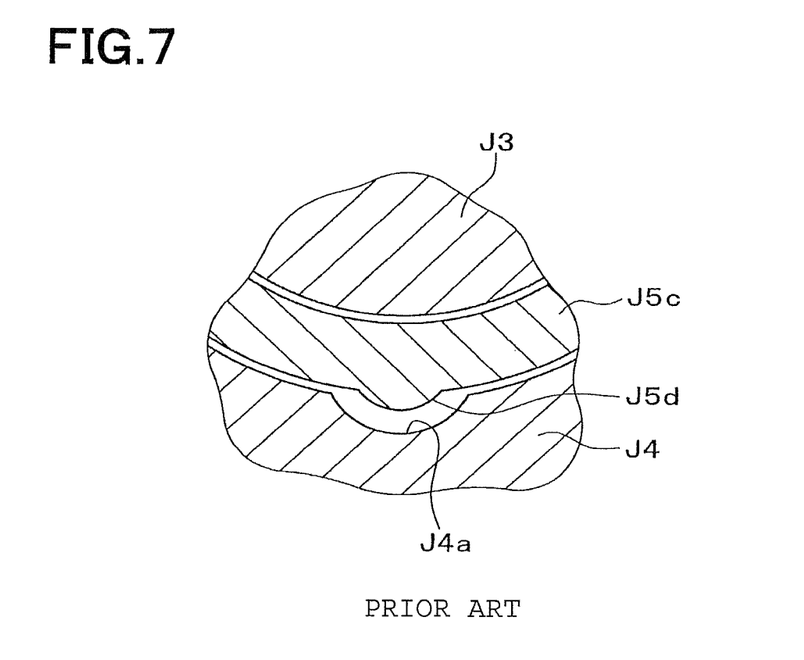
FIG. 7 is a cross sectional arrow view of FIG. 6.

For example, as shown in FIG. 7 which is a Z-Z cross sectional arrow view of FIG. 6, a protruding portion J5d is formed at an outer periphery of an annular cover separator J5c which is fixed to the resin annular member J5a, and a key groove J4a is formed at a part of the casing J4 corresponding to the protruding portion J5d. This structure prevents the resin annular member J5a from rotating relative to the casing J4. Therefore, this structure also prevents the rubber annular member J5b located at the outer periphery of the resin annular member J5a from rotating relative to the casing J4.

In addition, as shown in FIG. 6, the seal structure J6 includes a pin J6c for preventing rotation of the resin annular member J6a. This rotation preventing member composes a structure for preventing the resin annular member J6a from rotating relative to the casing J4. Therefore, this structure also prevents the rubber annular member J6b located at the outer periphery of the resin annular member J6a from rotating relative to the casing J4.

CITATION LIST

Patent Literature

[PTL 1] Japanese Patent Application Publication No. JP-A-2007-278084

SUMMARY OF INVENTION

Technical Problem

However, in the seal structures J5, J6 for sealing a void between the drive shaft J3 and the casing J4, in order to prevent wearing or peeling of the rubber annular members J5b, J6b, structures for preventing rotation are required so as to prevent the seal structures from rotating even if the drive shaft J3 rotates. This causes the seal structures to become complicated, have a large number of parts, and require high cost.

In light of the foregoing, it is an object to provide a rotation device provided with a seal structure which can prevent a rubber annular member from wearing or peeling without requiring a structure for preventing rotation.

Solution to Problem

In order to achieve the above-described object, an invention described in aspect 1 includes: a resin annular member including a shaft-side seal surface tightly in contact with the shaft and a casing-side seal surface tightly in contact with the casing, and having an annular storage chamber between the shaft-side seal surface and the casing-side seal surface; and a rubber annular member located in the annular storage chamber, being tightly in contact with each of an inner wall surface at each of an inner circumferential side and an outer circumferential side of the annular storage chamber, and thereby forming compartments into which the annular storage chamber are divided, wherein a first communication hole and a second communication hole are formed at the resin annular member, the first communication hole causing one of both parts into which the seal structure divides a void between the shaft and the casing to communicate with one of both of the compartments into which the rubber annular member divides the annular storage chamber, the second communication hole causing another one of both parts into which the seal structure divides the void between the shaft and the casing to communicate with another one of both of the compartments into which the rubber annular member divides the annular storage chamber.

As is described above, in the seal structure, the rubber annular member are disposed in the annular storage chamber of the resin annular member. Therefore, it is possible to form a structure in which the annular rubber member does not come in direct contact with the drive shaft. Therefore, it is possible to obtain a seal structure which can prevent the rubber annular member from wearing or peeling without requiring a structure for preventing the seal member from rotating.

In addition, when a brake fluid pressure is applied through either one of the first and second communication hole to at least one of both compartments into which the rubber annular member divides the annular storage chamber, the rubber annular member is pushed and is accordingly deformed elastically. With this elastic force, the rubber annular member pushes and stretches the resin annular member. Therefore, the seal structure can achieve self-sealing with a higher pressing force when a brake fluid pressure is applied. As a result, it is possible to improve sealing capability.

In an invention described in aspect 2, the rotation device including the seal structure according to Claim 1, wherein only one of the first and second communication holes forms an annular insertion opening, and the rubber annular member is housed through the insertion opening in the annular storage chamber.

In this way, it is possible to form an annular insertion opening by using one of the first and second communication holes and easily dispose the rubber annular member into the annular storage chamber through the annular insertion opening. Therefore, the seal structure can be simple.

In this case, as is described in aspect 3, an inner wall surface for forming the annular storage chamber is favorably a tapered surface which makes the annular storage chamber become narrower in a radial direction as the tapered surface gets apart from the rubber annular member.

If the tapered surface is formed in an inner wall surface of the annular storage chamber as is described above, it is possible to further deform the rubber annular member elastically when the rubber annular member moves caused by a pressure of fluid which is a target of sealing. Therefore, the seal structure can achieve self-sealing with a higher pressing force when a brake fluid pressure is applied. As a result, it is possible to further improve sealing capability. In addition, if such tapered face is disposed at both of the compartment, it is possible to keep high sealing capability even if, for example, pressure pulsation in which a compartment having a higher brake fluid pressure switches repeatedly between the compartments. In addition, it is possible to prevent the rubber annular member from falling out from the resin annular member.

In an invention described in aspect 4, a convex portion is formed at a said insertion opening side outer peripheral surface of the resin annular member, and a said insertion opening side tapered surface is formed in a manner that the convex portion is pressed toward an interior by being inserted into the center hole and that the insertion opening is accordingly compressed.

With this structure, an aperture size of the insertion opening of the annular storage chamber at the resin annular member can be larger before the seal structure is inserted into the center hole than after it is inserted. Therefore, it is easy to insert the rubber annular member into the annular storage chamber. After insertion, by installing the resin annular member to the rubber annular member, the convex portion is pressed toward an interior and the insertion opening is accordingly compressed. Thus, the insertion opening side tapered surface can be easily formed.

DESCRIPTION OF EMBODIMENTS

Hereinafter, embodiments of the present invention will be explained based on the drawings. Note that portions that are the same or equivalent to each other in each of the embodiments are hereinafter described while assigned the same reference numerals in the drawings.

First Embodiment

Figure 1:
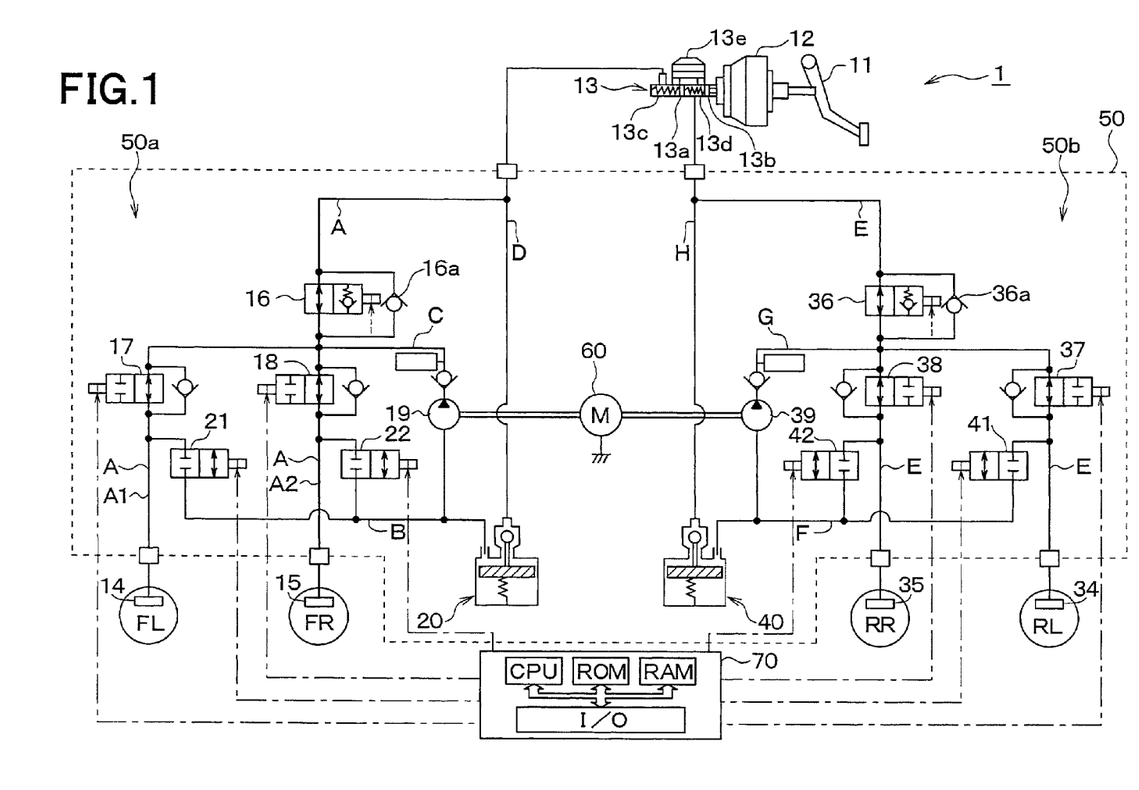
FIG. 1 is a brake piping schematic diagram of a vehicle brake device to which a rotary pump device serving as a rotation device according to a first embodiment of the present invention is applied.

Hereinafter, the embodiments of the present invention that are shown in the drawings will be explained. FIG. 1 shows a brake piping schematic diagram of a vehicle brake device to which a rotary pump device serving as a rotation device according to a first embodiment of the present invention is applied. Hereinafter, a basic structure of the vehicle brake device 1 will be explained based on FIG. 1. Here, an example will be explained in which the vehicle brake device 1 according to the present invention is applied to a front wheel drive four-wheeled vehicle that includes a hydraulic circuit in a front-rear piping arrangement. However, the present invention can also be applied to an X piping arrangement that includes respective piping systems of right front wheel to left rear wheel, and left front wheel to right rear wheel.

As shown in FIG. 1, when a driver depresses a brake pedal 11, which is a brake operating member, the depression force is boosted by a servo unit 12 and pushes master pistons 13a, 13b that are disposed in a master cylinder (hereinafter referred to as an M/C) 13. As a result, a same M/C pressure is generated in a primary chamber 13c and a secondary chamber 13d that are demarcated by the master pistons 13a, 13b. The M/C pressure is transmitted to respective wheel cylinders (hereinafter referred to as W/Cs) 14, 15, 34, 35 via a brake fluid pressure control actuator 50. The M/C 13 is provided with a master reservoir 13e having passages that is communicatively connected with the primary chamber 13c and the secondary chamber 13d, respectively.

The brake fluid pressure control actuator 50 is provided with a first piping system 50a and a second piping system 50b. The first piping system 50a controls the brake fluid pressure applied to a left front wheel FL and a right front wheel FR, while the second piping system 50b controls the brake fluid pressure applied to a right rear wheel RR and a left rear wheel RL.

The first piping system 50a and the second piping system 50b have a same structure. Therefore, hereinafter, the first piping system 50a will be explained and an explanation of the second piping system 50b will be omitted.

The first piping system 50a is provided with a conduit A which transmits the above-described M/C pressure to the W/C 14 provided in the left front wheel FL and to the W/C 15 provided in the right front wheel FR, and which serves as a main conduit that generates a W/C pressure.

The conduit A is provided with a first differential pressure control valve 16 that can be controlled to a communicated state and a differential pressure state. A valve position of the first differential pressure control valve 16 is adjusted such that the first differential pressure control valve 16 is in the communicated state during normal braking (when vehicle motion control is not being performed) when the driver performs an operation of the brake pedal 11. When a current is applied to a solenoid coil provided in the first differential pressure control valve 16, the valve position is adjusted such that, the larger the value of the current is, the larger the differential pressure is.

In a case where the first differential pressure control valve 16 is in the differential pressure state, the brake fluid is allowed to flow from the W/C 14, 15 side to the M/C 13 side only when the brake fluid pressure on the W/C 14, 15 side is higher than the M/C pressure by a predetermined pressure or more. Therefore, the brake fluid pressure on the W/C 14, 15 side is constantly maintained not to become higher than the pressure on the M/C 13 side by the predetermined pressure or more.

The conduit A branches into two conduits A1, A2 on the W/C 14, 15 side, which is downstream of the first differential pressure control valve 16. A first pressure increasing control valve 17, which controls a pressure increase in the brake fluid pressure to the W/C 14, is provided in the conduit A1. A second pressure increasing control valve 18, which controls a pressure increase in the brake fluid pressure to the W/C 15, is provided in the conduit A2.

The first and the second pressure increasing control valves 17, 18 are each formed by a two-position electromagnetic valve that can be controlled between a communicated state and a closed state. More specifically, the first and the second pressure increasing control valves 17, 18 are normally open valves in which, when a control current applied to solenoid coils provided in the first and the second pressure increasing control valves 17, 18 is zero (i.e. when no current is applied), they are brought into the communicated state, and when the control current is allowed to flow to the solenoid coils (i.e., when applying current), they are controlled to the closed state.

A conduit B, serving as a pressure reducing conduit, connects a portion of the conduit A between the first pressure increasing control valve 17 and the W/C 14 with a pressure adjusting reservoir 20, and connects a portion of the conduit A between the second pressure increasing control valve 18 and the W/C 15 with the pressure adjusting reservoir 20. The conduit B is provided with a first pressure reducing control valve 21 and a second pressure reducing control valve 22 that are each formed by a two-position electromagnetic valve that can be controlled between a communicated state and a closed state. The first and the second pressure reducing control valves 21, 22 are normally closed valves in which, when a control current applied to solenoid coils provided in the first and the second pressure reducing control valves 21, 22 is zero (i.e. when no current is applied), they are brought into the closed state, and when the control current is allowed to flow to the solenoid coils (i.e., when applying current), they are controlled to the communicated state.

A conduit C, serving as a reflux conduit, is provided between the pressure adjusting reservoir 20 and the conduit A that is the main conduit. The conduit C is provided with a self-priming pump 19 that is driven by a motor 60 and that sucks the brake fluid from the pressure adjusting reservoir 20 and discharges it to the M/C 13 side or to the W/C 14, 15 side. The motor 60 is driven by controlling current supply to a motor relay, which is not shown in the drawings.

Further, a conduit D, serving as an auxiliary conduit, is provided between the pressure adjusting reservoir 20 and the M/C 13. The brake fluid is sucked by the pump 19 from the M/C 13 through the conduit D and discharged to the conduit A. As a result, the brake fluid is supplied to the W/C 14, 15 side during vehicle motion control, and the W/C pressure of a target wheel is thereby increased. Note that, although the first piping system 50a is explained here, the second piping system 50b also has a similar structure, and the second piping system 50b is also provided with structural elements that are similar to those provided in the first piping system 50a. Specifically, the second piping system 50b is provided with a second differential pressure control valve 36 that corresponds to the first differential pressure control valve 16, third and fourth pressure increasing control valves 37, 38 that correspond to the first and the second pressure increasing control valves 17, 18, third and fourth pressure reducing control valves 41, 42 that correspond to the first and the second pressure reducing control valves 21, 22, a pump 39 that corresponds to the pump 19, a reservoir 40 that corresponds to the reservoir 20, and conduits E to H that correspond to the conduits A to D.

A brake ECU 70 controls a control system of a brake control system 1, and is constructed by a known microcomputer that is provided with a CPU, a ROM, a RAM, an I/O and the like. The brake ECU 70 performs processing, such as various types of calculation, according to programs stored in the ROM and the like, thus performing vehicle motion control such as antiskid control etc. More specifically, the brake ECU 70 calculates various types of physical quantities based on detection signals of sensors that are not shown in the drawings, and based on the calculation results, the brake ECU 70 determines whether or not to perform vehicle motion control. When the vehicle motion control is performed, the brake ECU 70 calculates a control amount for a control target wheel, namely, a W/C pressure to be generated at the W/C of the control target wheel. Based on a result of the calculation, the brake ECU 70 controls the supply of current to each of the control valves 16 to 18, 21, 22, 36 to 38, 41 and 42, and also controls the amount of current supplied to the motor 60 to drive the pumps 19, 39. Thus, the W/C pressure of the control target wheel is controlled and the vehicle motion control is performed.

When no pressure is generated at the M/C 13 as in traction control or antiskid control, for example, the pumps 19, 39 are driven, and at the same time, the first and the second differential pressure valves 16, 36 are brought into a differential state. Thus, the brake fluid is supplied through the conduits D, H to the downstream side of the first and the second differential pressure control valves 16, 36, namely, to the W/C 14, 15, 34, 35 side. Then, increase/decrease of the W/C pressure of the control target wheel is controlled by appropriately controlling the first to the fourth pressure increasing control valves 17, 18, 37, 38 or the first to the fourth pressure reducing control valves 21, 22, 41, 42. Thus, the W/C pressure is controlled to become a desired control amount.

Further, during antiskid (ABS) control, the first to the fourth pressure increasing control valves 17, 18, 37, 38 or the first to the fourth pressure reducing control valves 21, 22, 41, 42 are appropriately controlled, and at the same time, the pumps 19, 39 are driven. Thus, the increase/decrease of the W/C pressure is controlled, and the W/C pressure is controlled to become the desired control amount.

Figure 2:
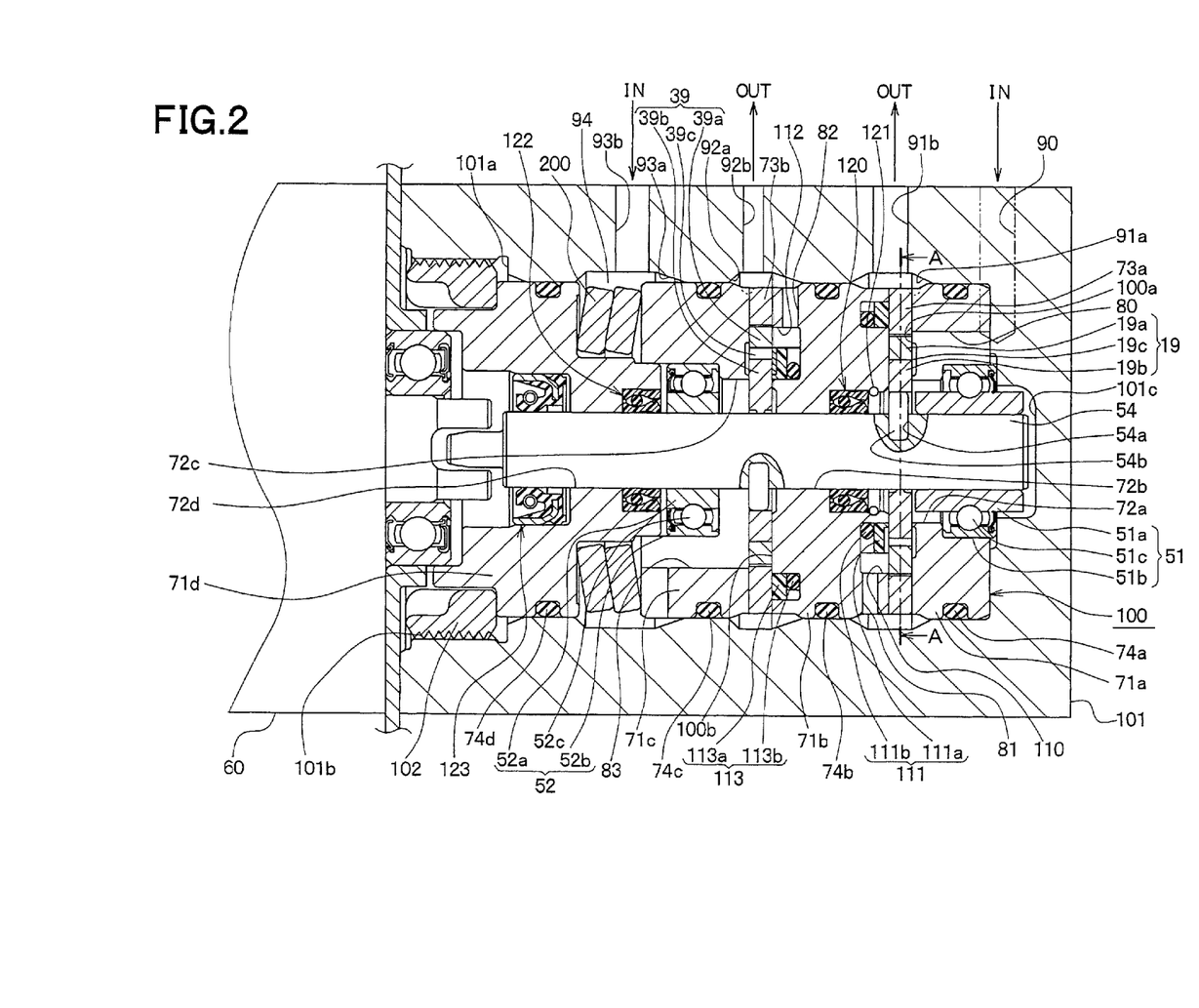
FIG. 2 is a cross sectional view of a pump body 100 including rotary pumps 19 and 39.

Next, the structures of the rotary pump devices, that is, detailed structures of the rotary pump devices 19 and 39 in the vehicle brake device 1 structured as described above will be explained. FIG. 2 is a cross-sectional diagram of a pump body 100 including the rotary pumps 19, 39. FIG. 2 shows a state in which the pump body 100 is assembled into a housing 101 of the brake fluid pressure control actuator 50, and the pump body 100 is assembled such that an up-down direction of the drawing is a vehicle vertical direction.

As described above, the vehicle brake device 1 is formed by the two systems, i.e., the first piping system 50a and the second piping system 50b. Therefore, the pump body 100 is provided with two pumps, i.e., the rotary pump 19 for the first piping system shown in FIGS. 1 and 2 and the rotary pump 39 for the second piping system shown in FIG. 2.

The rotary pumps 19, 39 that are incorporated in the pump body 100 are driven by the motor 60 rotating a drive shaft 54 that is supported by a first bearing 51 and a second bearing 52. A casing that forms an outer shape of the pump body 100 is formed by first, second, third, and fourth cylinders 71a, 71b, 71c, and 71d and first and second center plates 73a, 73b having a shape of a cylinder. The first bearing 51 is arranged in the first cylinder 71a and the second bearing 52 is arranged in the third cylinder 71c.

The first cylinder 71a, the first center plate 73a, the second cylinder 71b, the second center plate 73b, and the third cylinder 71c are sequentially aligned and outer peripheries of their overlapping portions are connected by welding A portion unitized by the welding becomes a first casing. The fourth cylinder 71d which is not included in the first casing serves as a second casing. The first casing and the second casing are coaxially arranged with a disc spring 200 sandwiched between these casings. The pump body 100 having an integrated structure is formed in this manner.

The pump body 100 with the integrated structure is inserted into a recessed portion 101a from the left side of the drawing. The recessed portion 101a has a substantially cylindrical shape and is formed in the housing 101 of the brake fluid pressure control actuator 50 (hereinafter, the direction in which the pump body 100 is inserted into the recessed portion 101a of the housing 101 is referred to simply as an insertion direction).

Then, a ring-shaped male screw member (screw) 102 is screwed into a female screw groove 101b that is formed in an entrance of the recessed portion 101a, thus fixing the pump 100 to the housing 101. Since the male screw member 102 is screwed, the pump body 100 is inhibited from being pulled out from the housing 101.

Further, a circular-shaped second recessed portion 101c is formed in the recessed portion 101a of the housing 101, at a leading end position in the insertion direction, more specifically, at a position corresponding to a leading end of the drive shaft 54. A portion of the first bearing 51 protrudes from an end surface (a forward end surface) at a forward side in the insertion direction and comes into the second recessed portion 101c. A portion of a bottom surface of the recessed portion 101a other than the second recessed portion 101c faces an end surface of the first cylinder 71a.

The first, second, third, and fourth center holes 72a, 72b, 72c, and 72d are formed at the first to fourth cylinders 71a to 71d, respectively. The first to fourth cylinders 71a to 71d are provided with first, second, third, and fourth center holes 72a, 72b, 72c, and 72d, respectively. The drive shaft 54 is inserted into the first to fourth center holes 72a to 72d, and is supported by the first bearing 51 that is fixed to an inner periphery of the first center hole 72a formed in the first cylinder 71a, and by the second bearing 52 that is fixed to an inner periphery of the third center hole 72c formed in the third cylinder 71c. Although bearings with any structure may be used as the first and the second bearing 51, 52, ball bearings are used in the present embodiment.

Specifically, the first bearing 51 is provided with an inner ring 51a, an outer ring 51b, and a rolling body 51c. The drive shaft 54 is axially supported by being fitted into a hole of the inner ring 51a. The diameter of the center hole 72a of the first cylinder 71a is enlarged, at a forward portion in the insertion direction of the center hole 71a, to have a dimension corresponding to the outer diameter of the first bearing 51. Therefore, the first bearing 51 is fixed to the first cylinder 71a by being press fitted into this enlarged diameter portion.

The second bearing 52 is structured such that it includes an inner ring 52a, an outer ring 52b and a rolling element 52c, and it is fixed by the outer ring 52b being press fitted into the center hole 72c of the third cylinder 71c. The drive shaft 54 is fitted into a hole in the inner ring 52a of the second bearing 52, and thus the drive shaft 54 is axially supported. Note that the drive shaft 54 is loose-fitted into the hole in the inner ring 52a so that the drive shaft 54 can move in the axial direction in the inner ring 52a of the second bearing 52.

The rotary pumps 19, 39 are provided in an area sandwiched by the first and the second bearings 51 and 52. Detailed structures of the rotary pumps 19, 39 will be explained with reference to FIG. 3, which shows an A-A cross-sectional diagram of FIG. 2.

Figure 3:
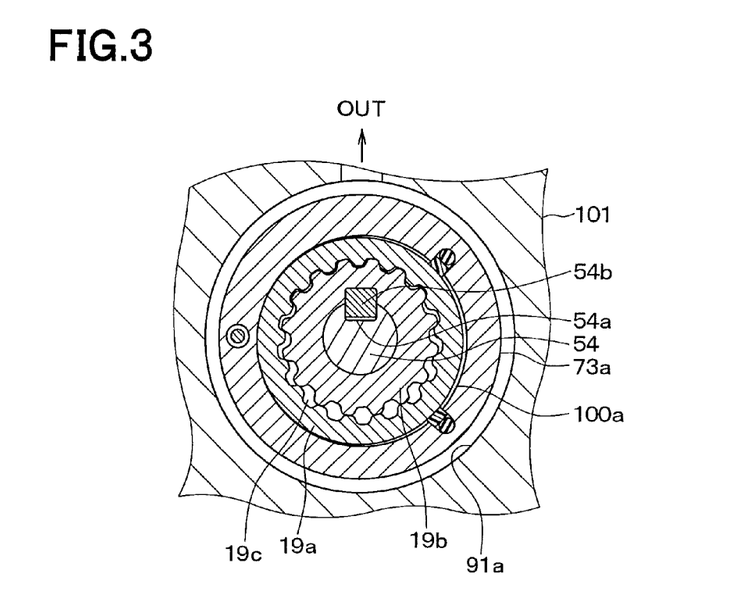
FIG. 3 is an A-A cross sectional view of FIG. 2.

The rotary pump 19 is arranged in a rotor chamber (a first rotor chamber) 100a, which is formed by sandwiching both sides of the first center plate 73a having a cylindrical shape between the first cylinder 71a and the second cylinder 71b. The rotary pump 19 is constructed by an internal gear pump (a trochoid pump), which is driven by the drive shaft 54 that is inserted into the rotor chamber 100a.

Specifically, the rotary pump 19 is provided with a rotating portion that is formed by: an outer rotor 19a having an inner periphery on which an inner teeth portion is formed; and an inner rotor 19b having an outer periphery on which an outer teeth portion is formed. The drive shaft 54 is inserted into a hole formed in the center of the inner rotor 19b. A key 54b is fittingly inserted into a hole 54a formed in the drive shaft 54, and a torque is transmitted to the inner rotor 19b by the key 54b.

The inner teeth portion and the outer teeth portion that are respectively formed on the outer rotor 19a and the inner rotor 19b are engaged with each other, and a plurality of void portions 19c are thereby formed. Sizes of the void portions 19c are changed by rotation of the drive shaft 54, and thus the brake fluid is sucked and discharged.

On the other hand, the rotary pump 39 is arranged in a rotor chamber 100b (a second rotor chamber) 100b, which is formed by sandwiching both sides of the second center plate 73b having a cylindrical shape between the second cylinder 71b and the third cylinder 71c, and the rotary pump 39 is driven by the drive shaft 54 that is inserted into the rotor chamber 100b. Similarly to the rotary pump 19, the rotary pump 39 is also an internal gear pump that is provided with an outer rotor 39a and an inner rotor 39b, and sucks and discharges the brake fluid using a plurality of void portions 39c that are formed by two teeth portions of the outer rotor 39a and the inner rotor 39b being engaged with each other. The rotary pump 39 is arranged such that the rotary pump 19 is rotated by approximately 180 degrees centered on the drive shaft 54. With this type of arrangement, the suction-side void portions 19c, 39c and the discharge-side void portions 19c, 39c of the respective rotary pumps 19, 39 are symmetrically positioned with the drive shaft 54 as a center. Thus, it is possible to cancel out forces applied to the drive shaft 54 by a high-pressure brake fluid on the discharge side.

Note the position arrangement of suction and discharge of the rotary pump 39 is not exactly reversed relative to that of the rotary pump 19. They are arranged so that a phase difference between discharge timings of the rotary pump 19 and the rotary pump becomes 180 degrees. In other words, timings at which the void portions 19c are communicated with a discharge port 81 described below in accordance with rotation of the rotary pump 19 and timings at which the void portions 39c are communicated with a discharge port 82 described below in accordance with rotation of the rotary pump 39 are not synchronized but differ by 180 degrees in phase. This makes it possible to cancel out pressure pulsations of brake fluid in the pump body 100 at the rotary pump 19 and the rotary pump 39. Therefore, it is possible to further reduce the pressure pulsations.

The first cylinder 71a is provided with a suction port 80 communicating with the suction-side void portions 19c of the rotary pump 19. The suction port 80 is formed so that it penetrates the first cylinder 71a from a rotary pump 19 side end surface to an opposite end surface of the first cylinder 71a. The suction port 80 is connected to a suction conduit 90 which is formed on the housing 101 so that it reaches a bottom surface of the recessed portion 101a. Therefore, the rotary pump 19 has a structure for sucking brake fluid through the suction conduit 90 and the suction port 80 from a bottom side of the recessed portion 101a of the pump body 100.

The second cylinder 71b is provided with a discharge port 81 communicating with the discharge-side void portion 19c of the rotary pump 19. The discharge port 81 is formed so that it extends at the second cylinder 71b from a rotary pump 19 side end surface to a peripheral surface of the second cylinder 71b. The discharge port 81 is connected to a discharge conduit 91b through an annular groove 91a, wherein the annular groove 91a is formed on the housing 101 so that it goes along an inner circumferential surface of the recessed portion 101a in a circumferential direction surrounding a whole circumference, and the discharge conduit 91b is formed so that it is connected to a part of the annular groove 91a. Therefore, the rotary pump 19 has a structure for discharging brake fluid through the discharge port 81, the annular groove 91a, and the discharges conduit 91b out of an outer periphery of the pump body 100. More specifically, the discharge port 81 is formed as follows.

The discharge port 81 includes not only a portion which is formed so that it goes from a rotary pump 19 side end face of the second cylinder 71b to an outer peripheral surface of the second cylinder 71b but also a passage composed by an annular groove 110 which is formed at a rotating portion side end surface of the second cylinder 71b so that it surrounds the drive shaft 54, wherein the rotating portion is a rotating portion of the rotary pump 19.

More specifically, a seal member 111 having a shape of a ring is provided at the annular groove 110, wherein the seal member 111 is positioned so that it pushes the outer rotor 19a and the inner rotor 19b in the axial direction. The seal member 111 is composed of a resin member 111a located at a rotating portion side of the seal member 111 and a rubber member 111b for pressing the resin member 111a to the rotating portion side. The suction-side void portions 19c and a gap between the first center plate 73a and an outer periphery of the outer rotor 19a that faces the suction-side void portions 19c are located on an inner peripheral side of the seal member 111. The discharge-side void portions 19c and a gap between the first center plate 73a and the outer periphery of the outer rotor 19a that faces the discharge-side void portions 19c are located on an outer peripheral side of the seal member 111. In other words, the sealing between a relatively low-pressure section and a relatively high-pressure section on the inner and outer peripheries of the seal member 111 is performed by the seal member 111.

The seal member 111 is in contact with an inner periphery of the annular groove 110 and is in contact with only a part of the entire outer periphery of the annular groove 110. A part of the annular groove 110 located at an outer peripheral side of the seal member 111 and not in contact with the seal member 111 is a void portion. In other words, the annular groove 110 has a region at which not all circumference of an outer periphery thereof is in contact with the seal portion 111, and brake fluid can flow in this region. The discharge port 81 is constructed including the void portion of the annular groove 110 formed in this way.

A discharge port 82 communicating with discharge-side void portions 39c of the rotary pump 39 is provided at an end surface located at the opposite side of the second cylinder 71b from the end surface of the second cylinder 71b at which the discharge port 81 is formed. The discharge port 82 is formed at the second cylinder 71b from a rotary pump 39 side end surface to a peripheral surface of the second cylinder 71b. The discharge port 82 is connected to a discharge conduit 92b through an annular groove 92a, wherein the annular groove 92a is formed on the housing 101 so that it goes along an inner circumferential surface of the recessed portion 101a in a circumferential direction surrounding a whole circumference, and the discharge conduit 92b is formed so that it is connected to a part of the annular groove 92a. Therefore, the rotary pump 39 has a structure for discharging brake fluid through the discharge port 82, the annular groove 92a, and the discharges conduit 92b out of an outer periphery of the pump body 100. More specifically, the discharge port 82 is formed as follows.

The discharge port 82 includes not only a portion which is formed so that it goes from a rotary pump 39 side end face of the second cylinder 72b to an outer peripheral surface of the second cylinder 72b but also a passage composed by an annular groove 112 which is formed at a rotating portion side end surface of the second cylinder 72b so that it surrounds the drive shaft 54, wherein the rotating portion is a rotating portion of the rotary pump 39.

More specifically, a seal member 113 having a shape of a ring is provided at the annular groove 112, wherein the seal member 113 is positioned so that it pushes the outer rotor 39a and the inner rotor 39b. This seal member 113 is composed of a resin member 113a located at a rotating portion side of the seal member 113 and a rubber member 113b for pressing the resin member 113a to the rotating portion side. The suction-side void portions 19c and a gap between the second center plate 73b and an outer periphery of the outer rotor 39a that faces the suction-side void portions 39c are located on an inner peripheral side of the seal member 113. The discharge-side void portions 39c and a gap between the second center plate 73b and the outer periphery of the outer rotor 39a that faces the discharge-side void portions 39c are located on an outer peripheral side of the seal member 113. In other words, the sealing between a relatively low-pressure section and a relatively high-pressure section on the inner and outer peripheries of the seal member 113 is performed by the seal member 113.

The seal member 113 is in contact with an inner periphery of the annular groove 112 and is also in contact with only a part of the entire outer periphery of the annular groove 112. A part of the annular groove 112 located at an outer peripheral side of the seal member 113 and not in contact with the seal member 113 is a void portion. In other words, the annular groove 112 has a region at which not all circumference of an outer periphery thereof is in contact with the seal portion 113, and brake fluid can flow in this region. The discharge port 82 is constructed including the void portion of the annular groove 112 formed in this way.

The third cylinder 71c is provided with a suction port 83 communicating with the suction-side void portions 39c of the rotary pump 39. The suction port 83 is formed so that it penetrates the third cylinder 71c from a rotary pump 39 side end surface to an opposite end surface (a backward end surface) of the third cylinder 71c. The suction port 83 is connected through a void between the third cylinder 71c and the fourth cylinder 71d to an annular groove 93a and a suction conduit 93b, wherein the annular groove 93a is formed on the housing 101 so that it goes along an inner circumferential surface of the recessed portion 101a in a circumferential direction surrounding a whole circumference, and the discharge conduit 93b is formed so that it is connected to a part of the annular groove 93a. Therefore, the rotary pump 39 has a structure for sucking brake fluid through the suction conduit 93b, the annular conduit 93a, the void 94 and the suction port 83 from a bottom side of the recessed portion 101a of the pump body 100.

Therefore, in FIG. 2, the suction conduit 90 and the discharge conduit 91b serves as the conduit C, the suction conduit 93b and the discharge conduit 92b serves as the conduit G.

The second center hole 72b of the second cylinder 71b is partially larger in diameter than the drive shaft 54. A seal member 120 is housed in a portion of the second center hole 72b which is larger in diameter than the drive shaft 54, wherein the seal member 120 seals and divides a void between the drive shaft 54 and the second cylinder 71b and thereby blocks out communication between the rotary pump 19 and the rotary pump 39. More specifically, the seal member 120 is inserted into the second center hole 72b of the second cylinder 71b from a first cylinder 71a side and is located so that movement of the seal member 120 in the direction coming in contact with the rotary pump 19 is restricted by a restriction ring 121 located at a rear position of the seal member 120 in this direction of insertion of the seal member 120. In a similar manner, the fourth center hole 72d of the fourth cylinder 71d is partially larger in diameter than the drive shaft 54. A seal member 122 is housed in a portion of the fourth center hole 72d which is larger in diameter than the drive shaft 54, wherein the seal member 122 seals and divides a void between the drive shaft 54 and the fourth cylinder 71d and thereby blocks out communication between the rotary pump 39 and the exterior of the housing 101. The seal member 120 and the seal member 122 serve as seal structural bodies which are features of the present invention. Precise structure of the members 120 and 122 are described later.

An oil seal (seal member) 123 is provided at a motor 60 side of the seal member 122. With this configuration, although the seal member 122 basically prohibits brake fluid leakage through the fourth center hole 72d to the outside, and the oil seal 123 ensures this advantageous effect.

At a fourth cylinder 71d side of the third cylinder 71c, the inner radius of the third cylinder 71c is larger than an outer radius of the fourth cylinder 71d at a leading end side in the insertion direction of the fourth cylinder 71d. A leading end portion of the fourth cylinder 71d is fitted in this fourth cylinder 71d side portion of the third cylinder 71c. A disc spring 200 is located so that it surrounds a leading end portion of the fourth cylinder 71d which is not fitted in the third cylinder 71c. This disc spring 200 biases the first casing and second casing in the axial direction and thereby generates an axial force of the first and second casings.

O-rings 74a, 74b, 74c, and 74d are located at outer circumferential surfaces of the first to fourth cylinder 71a to 71d, respectively. The O-rings 74a to 74d are for sealing brake fluid at the suction conduits 90, 93b and discharge conduits 91b, 92b. The O-ring 74a is located between the suction conduit 90 and the discharge conduit 91b. The O-ring 74b is located between the discharge conduit 91b and the discharge conduit 92b. The O-ring 74c is located between the discharge conduit 92b and the suction conduit 93b. The O-ring 74d is located between the suction conduit 93b and the exterior of the housing 101.

The diameter of the outer circumferential surface of the fourth cylinder 71d is reduced at an entrance side of a recessed portion of the fourth cylinder 71d, and a stepped portion is thereby formed. The above-described ring-shaped male screw member 102 is fitted into this reduced diameter portion, and the pump body 100 is thereby fixed. Thus, the fourth cylinder 71d does not rotate caused by the rotation of the drive shaft 54.

The pump body 100 is structured as described above. In the pump body 100 structured in this way, the incorporated rotary pumps 19, 39 perform a pump operation of suction/discharge of the brake fluid in response to the drive shaft 54 being rotated by a rotation axis of the motor 60. As a result, vehicle motion control is performed by the vehicle brake device 1.

Figure 4:
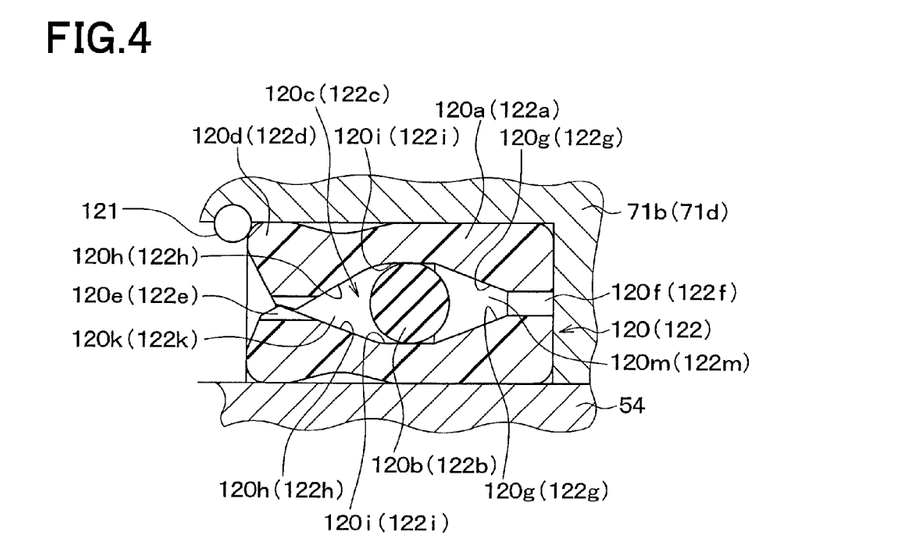
FIG. 4 is a cross sectional view showing a seal member 120 installed to the pump body 100.
Figure 5:
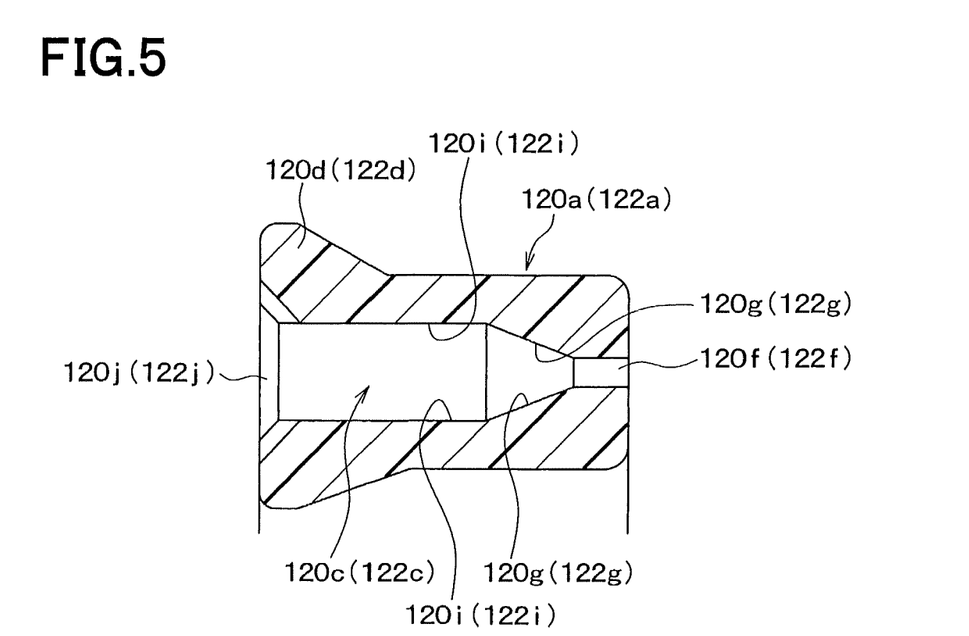
FIG. 5 is a cross sectional view showing a seal member 120 at a time before it is installed.

Next, descriptions are given of seal structures of the seal members 120 and 122 included by the pump body 100 having the above-described structure. FIG. 4 is a cross sectional view showing the seal member 120 installed to the pump body 100 shown in FIG. 2. FIG. 5 is a cross sectional view of the seal member 120 which has not been attached to the pump body 100 yet. Although cross sectional views of the seal member 120 are shown here, cross sectional views of the seal member 122 have the same structures. The reference characters shown within parentheses indicate portions of the seal members 122 (otherwise, members related to it) corresponding to respective portions of the seal member 120 (otherwise, members related to it).

The seal member 120 (122) shown in FIG. 4 has a structure including resin annular member 120a (122a) and a rubber annular member 120b (122b).

The resin annular member 120a (122a) includes an shaft-side seal surface which is an inner circumferential wall at a drive shaft 54 side and also includes a casing-side seal surface which is an outer circumferential wall at a second cylinder 71b (fourth cylinder 71d if the seal member 122 is concerned) side. At the shaft-side seal surface and the casing-side seal surface, the resin annular member 120a (122a) is tightly in contact with the drive shaft 54 and the second cylinder 71b (the fourth cylinder 71d). An annular storage chamber 120c (122c) is formed between the shaft-side seal surface and the casing-side seal surface of the resin annular member 120a (122a), and the rubber annular member 120b (122b) is housed in the annular storage chamber 120c (122c).

More specifically, before the resin annular member 120a (122a) is installed to the pump body 100, the resin annular member 120a (122a) has, as is shown in FIG. 5, a U-shaped cross section and an annular insertion opening 120j (122j) which is for inserting the rubber annular member 120b (122b) and is formed at only one side in the axial direction. The resin annular member 120a (122a) includes a convex portion 120d (122d) which is formed so that its outer diameter is larger at a rear position than at a front portion in the direction of insertion of the resin annular member 120a (122a) into the center hole 72b of the second cylinder 71b (the center hole 72d of the fourth cylinder 71d if the seal member 122 is concerned). When the rubber annular member 120b (122b) is inserted along with the resin annular member 120a (122a) into the center hole 72b, the convex portion 120d (122d) comes in contact with the inner wall surface of the center hole 72b and is pressed by this inner wall surface. The insertion opening 120j (122j) is accordingly compressed toward its interior side and the rubber annular member 120b (122b) is held in the annular chamber 120c (122c).

By prohibiting the compressed insertion opening 120j (122j) from being closed, or, by forming a slit at an insertion opening 120j (122j) side of an inner wall surface 120i (122i) of the resin annular member 120a (122a), a first communication hole 120e (122e) is formed at the insertion opening 120j (122j) side of the resin annular member 120a (122a) after the installation. An insertion opening 120j (122j) side compartment 120k (122k) is formed which is an insertion opening 120j (122j) side one of compartments into which the rubber annular member 120b (122b) divides the annular storage chamber 120c, and this compartment 120k (122k) is communicated through the first communication hole 120e (122e) with one of both parts of the void between the drive shaft 54 and the second cylinder 71b (the fourth cylinder 71d if the seal member 122 is concerned), wherein the void is divided into said both parts by the seal member 120 (122).

In a similar manner, second communication hole 120f (122f) are formed at a bottom surface side which is the opposite side of the annular resin member 120a (122a) from the insertion opening 120j (122j). The second communication hole 120f (122f) are aligned in the circumferential direction at even intervals. A bottom surface side compartment 120m (122m) is formed which is a bottom surface side one of compartments into which the rubber annular member 120b (122b) divides the annular storage chamber 120c, and this compartment 120m (122m) is communicated through the second communication hole 120f (122f) with another one of said both parts of the void between the drive shaft 54 and the second cylinder 71b (the fourth cylinder 71d if the seal member 122 is concerned), wherein the void is divided into said both parts by the seal member 120 (122).

In the annular storage chamber 120c (122c), the bottom surface side and the insertion side of the inner wall surface 120i (122i) of the resin annular member 120a (122a) are tapered surfaces 120g (122g) and 120h (122h) which make the annular storage chamber 120c, 122c become narrower in the radial direction as it gets apart from the rubber annular member 120b, 122b. The tapered surface 120h (122h) at the insertion side of the resin annular member 120a (122a) is formed in the manner that the inner wall surface 120i (122i) of the compressed annular resin member 120a (122a) slants. Each tapered surface includes not only one having a linear shaped cross section but also one having a curved cross section.

The rubber annular member 120b (122b) seals a void between both compartments 120k and 120m (122k, 122m) into which the rubber annular member 120b (122b) divides the annular storage chamber 120c (122c). A width of the rubber annular member 120b (122b) in the radial direction (i.e. a difference between an outer radius and an inner radius thereof) is nearly equal to a distance in the same direction in the annular storage chamber 120c (122c) between the inner walls of the resin annular member 120a (122a). The rubber annular member 120b (122b) is in contact with a an inner circumferential wall surface (a wall surface at the drive shaft 54 side) and an outer circumferential wall surface (a wall surface at the opposite side from the drive shaft 54) in the annular storage chamber 120c (122c) and thereby seals an interior of the annular storage chamber 120c (122c). Although the rubber annular member 120b (122b) is constructed as an O-ring in the present embodiment, it may be constructed as another rubber annular seal such as an X-ring, and a C-ring. The rubber annular member 120b (122b) only have to be made of rubber at least at an outer wall of a portion which is in contact with the resin annular member 120a (122a). For example, the interior of the rubber annular member 120b (122b) may be made of soft resin or the like.

The seal member 120 (122) is constructed in this way. When the seal member 120 (122) constructed in this way is inserted into the center hole 72b (72d) with the rubber annular member 120b (122b) located in the resin annular member 120a (122a), the entire circumference of the inner circumferential wall of the resin annular member 120a (122a) comes in contact with the drive shaft 54, and the entire circumference of the outer circumferential wall of the resin annular member 120a (122a) comes in contact with the second (fourth) cylinder 71b (71d). In addition, the rubber annular member 120b (122b) located in the annular storage chamber 120c (122c) of the resin annular member 120a (122a) comes in contact with the inner circumferential wall surface and the outer circumferential wall surface in the annular storage chamber 120c (122c). The contact can basically achieve sealing a void between the resin annular member 120a (122a) and the drive shaft 54 and sealing a void between the resin annular member 120a (122a) and the second (fourth) cylinder 71b (71d).

In addition, the rubber annular member 120b (122b) is located in the annular storage chamber 120c (122c) of the resin annular member 120a (122a). Therefore, when a brake fluid pressure is applied to at least one of both compartments 120k and 120m (122k and 122m) into which the rubber annular member 120b (122b) divides the annular storage chamber 120c (122c), the rubber annular member 120b (122b) is pushed toward a tapered surface 120g (122g), 120h (122h) side and is accordingly deformed elastically. With this elastic force, the rubber annular member 120b (122b) pushes and stretches the resin annular member 120a (122a). Therefore, the seal member 120 (122) can achieve self-sealing with a higher pressing force when a brake fluid pressure is applied. As a result, it is possible to improve sealing capability. In addition, it is possible to prevent the rubber annular member 120b (122b) from falling out from the resin annular member 120a (122a).

In addition, since this self-sealing structure is achieved by locating the rubber annular member 120b (122b) in the annular storage chamber 120c (122c) of the resin annular member 120a (122a), the rubber annular member 120b (122b) does not comes in direct contact with the drive shaft 54. Therefore, problem to be caused by wearing and peeling does not arise. Therefore, it is possible to obtain a seal structure which can prevent the rubber annular member 120b (122b) from wearing or peeling without requiring a structure for preventing the seal member 120 (122) from rotating.

Even if the resin annular member 120a (122a) wears, the self-sealing is achieved when a brake fluid pressure is applied to at least one of both compartments 120k and 120m (122k and 122m) into which the rubber annular member 120b (122b) divides the annular storage chamber 120c (122c). Therefore, sealing function works irrespective of wearing of the resin annular member 120a (122a).

As is described above, in the seal member 120 (122) installed to the rotary pump device according to the present embodiment, the rubber annular member 120b (122b) are disposed in the annular storage chamber 120c (122c) of the resin annular member 120a (122a). Therefore, it is possible to form a structure in which the annular rubber member 120b (122b) does not come in direct contact with the drive shaft 54. Therefore, it is possible to obtain a seal structure which can prevent the rubber annular member 120b (122b) from wearing or peeling without requiring a structure for preventing the seal member 120 (122) from rotating. In addition, it is possible to reduce the number of parts and cost of the seal structure because it is possible to obtain such a simple seal structure which does not require a structure for preventing rotation.

Moreover, the self-sealing is achieved when a brake fluid pressure is applied to at least one of both compartments 120k and 120m (122k and 122m). Therefore, sealing function works irrespective of wearing of the resin annular member 120a (122a) into which the rubber annular member 120b (122b) divides the annular storage chamber 120c (120c). In other words, when a brake fluid pressure is applied to at least one of both compartments 120k and 120m (122k and 122m) into which the rubber annular member 120b (122b) divides the annular storage chamber 120c (122c), the rubber annular member 120b (122b) is pushed and is accordingly deformed elastically. With this elastic force, the rubber annular member 120b (122b) pushes and stretches the resin annular member 120a (122a). Therefore, the seal member 120 (122) can achieve self-sealing with a higher pressing force when a brake fluid pressure is applied. As a result, it is possible to improve sealing capability.

Especially, since the tapered surfaces 120g (122g) and 120h (122h) are formed on the inner wall surface 120i (122i) of the annular storage chamber 120c (122c), it is possible to further deform the rubber annular member 120b (122b) elastically. Therefore, the seal member 120 (122) can achieve self-sealing with a higher pressing force when a brake fluid pressure is applied. As a result, it is possible to improve sealing capability further. Furthermore, since such tapered faces 120g (122g) and 120h (122h) is disposed at both of the compartment 120k and 120m (122k and 122m), it is possible to keep high sealing capability even if, for example, pressure pulsation in which a compartment having a higher brake fluid pressure switches repeatedly between the compartments 120k and 120m (122k and 122m).

Furthermore, the first and second communication holes 120e (122e) and 120f (122f) are provided which enable communication between exterior of both compartments 120k, 120m (122k, 122m) and both compartments 120k,120m (122k, 122m) into which the rubber annular member 120b (122b) divides the annular storage chamber 120c (120c). Therefore, in filling each portion composing the vehicle brake device 1 with brake fluid, it is possible to fill the each compartment 120k, 120m (122k, 122m) with brake fluid through the first or second communication hole 120e (122e), 120f (122f). Therefore, it is possible to achieve sufficient air bleeding.

Other Embodiments

In the above embodiments, the insertion opening 120j (122j) of the annular storage chamber 120c (122c) at the resin annular member 120a (122a) shrinks when the seal member 120 (122) is inserted into the center hole 72b (72d). However, the seal member 120 (122) may have the structure shown in FIG. 4 even before it is inserted.

It should be noted that, if the structure shown in FIG. 5 is used, an aperture size of the insertion opening 120j (122j) of the annular storage chamber 120c (122c) at the resin annular member 120a (122a) can be larger before the seal member 120 (122) is inserted into the center hole 72b (72d) than after it is inserted. Therefore, it is easy to insert the rubber annular member 120b (122b) into the annular storage chamber 120c (122c). In addition, in the casing that the resin annular member 120a (122a) is formed by resin molding so that it has the structure shown in FIG. 4 from the beginning, the resin annular member 120a (122a) has to be forcibly drawn in demolding because the insertion opening 120j (122j) is narrow. However, demolding can be done easily without forcible drawing if it has the structure shown in FIG. 5. Therefore it is possible to easily manufacture the resin annular member 120a (122a) and accordingly reduce manufacturing cost.

In the embodiments described above, a device in which the rotary pumps 19 and 39 are driven by rotation of the drive shaft 54 is described as an example of a rotation device. However, the rotary pumps 19 and 39 are not indispensable. The present invention may be applied to a rotation device having a shaft which rotates relative to a casing as a seal structure between the shaft and the casing.

REFERENCE SIGNS LIST

1 . . . vehicle brake device, 19, 39 . . . rotary pump, 19a, 39a . . . outer rotor, 19b, 39b . . . inner rotor, 19c, 39c . . . void portion, 54 . . . drive shaft, 71a-71d . . . first to fourth cylinders, 72a-72d . . . center hole, 73a, 73b . . . first and second center plate, 80, 83 . . . intake port, 81, 82 . . . discharge port, 100 . . . pump body, 101 . . . housing, 101a . . . recessed portion, 120, 122 . . . seal member, 120a, 122a . . . resin annular member, 120b, 122b . . . rubber annular member, 120c, 122c . . . annular storage chamber, 120e, 120f, 122e, 122f . . . first and second communication holes

The invention claimed is:

1. A rotation device comprising:
a shaft possessing a longitudinal axis along a length of the shaft, the longitudinal axis defining an axial direction and a radial direction;
a casing at which a center hole is formed so as to house the shaft while allowing relative rotation of the shaft; and
a seal member located in the center hole of the casing, the seal member accordingly sealing a void between the shaft and the casing,
the seal member including:
a resin annular member including a shaft-side seal surface in contact with the shaft and a casing-side seal surface in contact with the casing, and having an annular storage chamber between the shaft-side seal surface and the casing-side seal surface, the annular storage chamber being annular about the shaft; and
a rubber annular member located in the annular storage chamber, the rubber annular member being in contact with an inner wall surface of the resin annular member and accordingly dividing the annular storage chamber into a first compartment and a second compartment,
wherein a first portion of the resin annular member is between the rubber annular member and the shaft so that the rubber annular member is spaced away from the shaft and a second portion of the resin annular member is between the rubber annular member and the casing so that the rubber annular member is spaced away from the casing, the seal member being positioned in the void between the shaft and the casing so that a first part of the void exists on one axial end of the seal member and a second part of the void exists on an opposite axial end of the seal member opposed to the one end of the seal member, a first communication and a second communication hole formed in the resin annular member, the first part communicates with the first compartment through the first communication hole, the second part communicates with the second compartment though the second communication hole,
and wherein the resin annular member has a U-shaped cross section before the seal member is positioned in the void.

2. The rotation device according to claim 1, wherein the second communication hole is one of a plurality of communication holes, and the plurality of communication holes are aligned in a circumferential direction around the shaft at even intervals.

3. The rotation device according to claim 1, wherein the first communication hole is formed at an annular insertion opening side of the resin annular member, the rubber annular member being located in the annular storage chamber after being passed through the annular insertion opening during assembly of the rotation device.

4. The rotation device according to claim 3, wherein the inner wall surface of the resin annular member forms the annular storage chamber, and the inner wall surface of the resin annular member includes a first taper at which a radial dimension of the annular storage chamber decreases in a direction away from the rubber annular member.

5. The rotation device according to claim 4, wherein
the resin annular member has a first end and a second end opposite the first end, the second end being spaced in the axial direction from the annular insertion opening disposed at the first end, a convex portion being formed on an outer peripheral surface of the resin annular member at the first end of the resin annular member prior to the resin annular member being positioned in the void between the shaft and the casing, and when the seal member is disposed in the void between the shaft and the casing, the convex portion of the resin annular member contacts an inner surface of the casing to radially inwardly press the convex portion and cause the inner wall surface of the resin annular member to taper and form a second taper that narrows toward the first end of the resin annular member, and the annular insertion opening is accordingly compressed.

6. A rotation device comprising:

a casing provided with a center hole;

a rotatable shaft positioned in the center hole of the casing to rotate relative to the casing, and a void between the shaft and the casing, the shaft possessing a longitudinal axis along a length of the shaft, the longitudinal axis defining an axial direction and a radial direction;

a seal member located in the center hole of the casing and sealing the void, the seal member including a resin annular member and a rubber annular member;

the resin annular member possessing a shaft-side seal surface in contact with the shaft and a casing-side seal surface in contact with the casing, the resin annular member including an annular storage chamber between the shaft-side seal surface and the casing-side seal surface, the annular storage chamber being annular about the shaft;

the rubber annular member being located in the annular storage chamber and in contact with an inner wall surface of the resin annular member to divide the annular storage chamber into a first compartment and a second compartment;

a first portion of the resin annular member being located between the rubber annular member and the shaft, and the rubber annular member being spaced from the entirety of the shaft;

a second portion of the resin annular member being located between the rubber annular member and the casing, and the rubber annular member being spaced from the entirety of the casing;

the seal member being positioned in the void between the shaft and the casing so that a first part of the void exists on one axial end of the seal member and a second part of the void exists on an opposite axial end of the seal member opposed to the one end of the seal member; and the resin annular member including a first communication hole and a second communication hole, the first part of the void communicating with the first compartment through the first communication hole.

* * * * *